United States Patent
Niehaus et al.

(10) Patent No.: US 7,119,279 B2
(45) Date of Patent: Oct. 10, 2006

(54) PROTECTIVE SLEEVE

(75) Inventors: Robert Niehaus, Portland, OR (US); John E. Nemazi, Bloomfield Hills, MI (US); Michael D. Turner, Royal Oak, MI (US)

(73) Assignee: Zipsleeve, LLC, Portland, OR (US)

( * ) Notice: Subject to any disclaimer, the term of this patent is extended or adjusted under 35 U.S.C. 154(b) by 0 days.

(21) Appl. No.: 10/704,083

(22) Filed: Nov. 7, 2003

(65) Prior Publication Data

US 2005/0098345 A1    May 12, 2005

(51) Int. Cl.
H02G 3/04    (2006.01)

(52) U.S. Cl. .......................... 174/72 A; 174/DIG. 11; 174/135; 174/136; 138/128; 428/36.1

(58) Field of Classification Search .............. 174/68.1, 174/68.3, 72 A, 96, 98, 100, 135, 136, DIG. 11; 138/128; 428/36.1
See application file for complete search history.

(56) References Cited

U.S. PATENT DOCUMENTS

| | | | | |
|---|---|---|---|---|
| 2,522,072 A | * | 9/1950 | Tierney, Jr. ............ | 174/35 MS |
| 2,585,054 A | * | 2/1952 | Stachura .................. | 174/36 |
| 3,038,558 A | * | 6/1962 | Plummer .................. | 184/16 |
| 3,092,530 A | * | 6/1963 | Plummer .................. | 138/151 |
| 3,213,573 A | * | 10/1965 | Bohr et al. ................ | 52/108 |
| 4,581,265 A | * | 4/1986 | Follette .................... | 428/36.1 |
| 4,684,762 A | * | 8/1987 | Gladfelter ................ | 174/36 |
| 4,891,256 A | * | 1/1990 | Kite et al. ................ | 428/36.1 |
| 5,023,394 A | * | 6/1991 | Watanabe et al. ......... | 174/35 R |
| 5,218,718 A | * | 6/1993 | Chih ........................ | 2/16 |
| 5,357,049 A | * | 10/1994 | Plummer, III ............ | 174/36 |
| 5,391,838 A | * | 2/1995 | Plummer, III ............ | 174/36 |
| 6,111,194 A | * | 8/2000 | Kroulik .................... | 174/47 |
| 6,440,160 B1 | * | 8/2002 | Cordani et al. ........... | 607/114 |
| 6,523,584 B1 | * | 2/2003 | Rehrig ...................... | 150/154 |
| 6,779,906 B1 | * | 8/2004 | Delmar .................... | 362/122 |

OTHER PUBLICATIONS

Package for ZipSleeve™; ZipSleeve, LLC; Portland, OR; Made In China; Front and Back.

* cited by examiner

*Primary Examiner*—Dean A. Reichard
*Assistant Examiner*—Adolfo Nino
(74) *Attorney, Agent, or Firm*—Brooks Kushman P.C.

(57) ABSTRACT

The present invention includes a protective sleeve assembly for cords having a longitudinal flexible sleeve for retaining the cords therein. The invention discloses various embodiments for obtaining a desired sleeve length. One such sleeve embodiment includes a pair of lengthwise fasteners affixed coterminously along its seam so that the sleeve and fasteners may be separated into a pair of sleeves. A method for protecting cords is provided as well.

19 Claims, 7 Drawing Sheets

PROTECTIVE SLEEVE

BACKGROUND OF THE INVENTION

1. Field of the Invention

The invention relates to protective sleeves, more particularly to a protective sleeve assembly for cords.

2. Background Art

Various applications require a plurality of cords to route from one location to another. These cords may include cables for providing power, telecommunications, audio/video signals, or the like. These cords may also include flow lines such as air, pneumatics, hydraulics, fluids, water, sewage or the like. In such applications where a plurality of cords are required, it may be desired to provide a protective cover to the cords.

The prior art has appreciated this desire and has accordingly provided a protective fabric sleeve having a longitudinal fastener provided along the seam thereof for enclosing a plurality of cords therein. The protective sleeve protects the cords from wear, and from the elements, and maximizes safety while managing the bundle of cords. The prior art protective sleeve includes a plurality of hook and loop straps formed therealong for mounting the protective sleeve to a support structure or alternatively tightening the sleeve about the cords disposed therein. The prior art protective sleeve also includes straps oriented adjacent to distal ends thereof for retaining a surplus of length of the cord that extends from the sleeve. Additionally, the prior art protective sleeve includes hook and loop straps formed at distal ends thereof for interconnecting a pair of protective sleeves end to end.

A goal of the present invention is to provide a protective sleeve assembly that provides a desired protective sleeve length.

SUMMARY OF THE INVENTION

An aspect of the present invention is to provide a protective sleeve assembly for cords having a longitudinal fabric sleeve with a pair of distal ends and a lengthwise seam formed therealong. A pair of lengthwise fasteners are affixed along the seam for enclosing the cords within the sleeve. The fasteners are oriented end to end in a coterminous manner. The sleeve may be selectively separated into a pair of sleeves at a region of the sleeve that is generally aligned with the coterminous ends of the pair of lengthwise fasteners, thus permitting a user to separate the sleeve to provide a desired sleeve length.

Another aspect of the invention is to provide a longitudinal fabric sleeve with a lengthwise fastener affixed along a seam thereof for closing cords therein. The sleeve and lengthwise fastener may be selectively separated to provide a desired protective sleeve length.

Yet another aspect of the invention is to provide a protective sleeve assembly with a series of openings formed therein, each for permitting a cord to pass therethrough.

A further aspect of the invention is to provide a method for protecting cords by providing a sleeve with a pair of lengthwise fasteners that is sized to receive a plurality of cords disposed therein. The method also provides a region of the sleeve that is generally aligned with coterminous ends of the fasteners, which may be separated.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
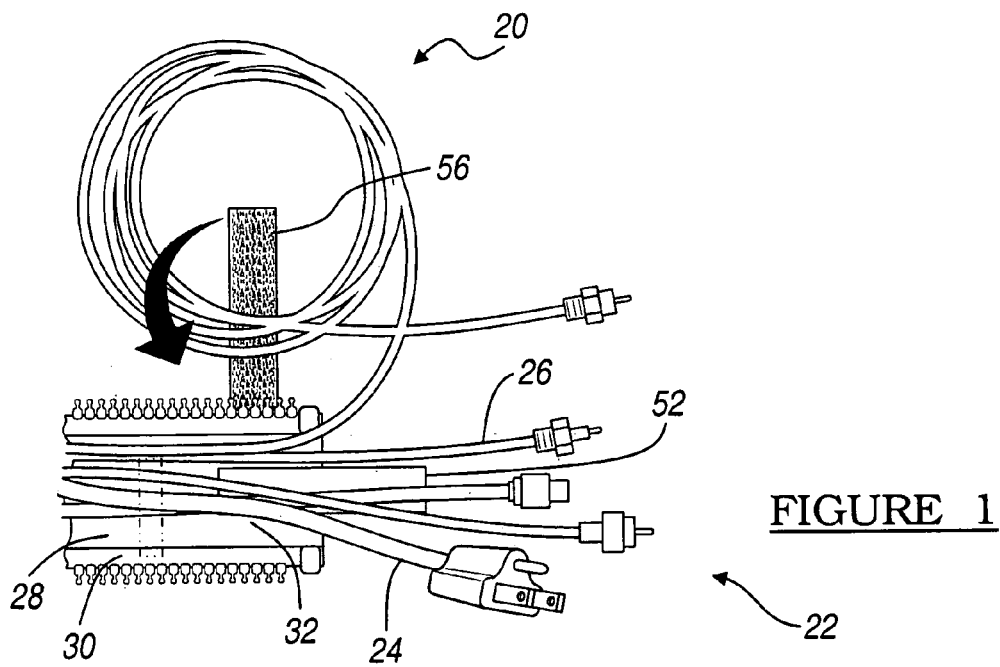
FIG. 1 is a partial top plan view of a distal end of a preferred embodiment protective sleeve assembly in accordance with the present invention.

Referring now to FIG. 1, a protective sleeve assembly is illustrated partially, specifically at one distal end thereof, and referenced generally by numeral 20. The protective sleeve assembly 20 is illustrated in an open orientation thereof in cooperation with a plurality of cords 22. The cords 22 may include, for example a power cord 24, or various audio/video or communication cables 26. The sleeve assembly 20 includes a longitudinal fabric sleeve 28. The fabric sleeve 28 is formed generally in a rectangular shape wherein the short sides thereof provide opposed distal ends such as the distal end illustrated in FIG. 1, and the long sides of the fabric sleeve rectangle collectively provide a seam of the sleeve 28. The sleeve assembly 20 includes a lengthwise fastener affixed along the seam so that the seam may be opened or closed. Specifically, the lengthwise fastener of the preferred embodiment includes two rows of plastic teeth mounted to longitudinal strips of a flexible substrate, which are each affixed to one side of the seam. The lengthwise fastener 30 also includes a sliding member (not shown) for opening and closing the lengthwise fastener 30 by drawing the teeth together in an interconnecting manner or disconnecting the teeth. The lengthwise fastener 30 of the preferred embodiment is commonly referred to as a zipper, and accordingly the lengthwise fastener 30 will be referred to as a zipper 30 hereinafter.

The zipper 30 operates such that the longitudinal sleeve 28 may be closed by securing the seam together and defining an internal region 32 within the longitudinal sleeve 28 that is sized to receive the plurality of cords 22 disposed therein. The protective sleeve assembly 20 operates such that a user may lay the assembly 20 on an underlying support surface in an open orientation as partially illustrated in FIG. 1. Then, the user places the cords 22 on the longitudinal sleeve 28 and subsequently closes the sleeve 28 by moving the sliding member of the zipper 30 in a direction that interconnects the seam. The invention contemplates that a protective sleeve assembly 20 may be used in various applications where cords 22 are required. Of course, various applications require various lengths of a protective sleeve assembly and therefore the preferred embodiment includes a feature for varying the length.

Figure 2:
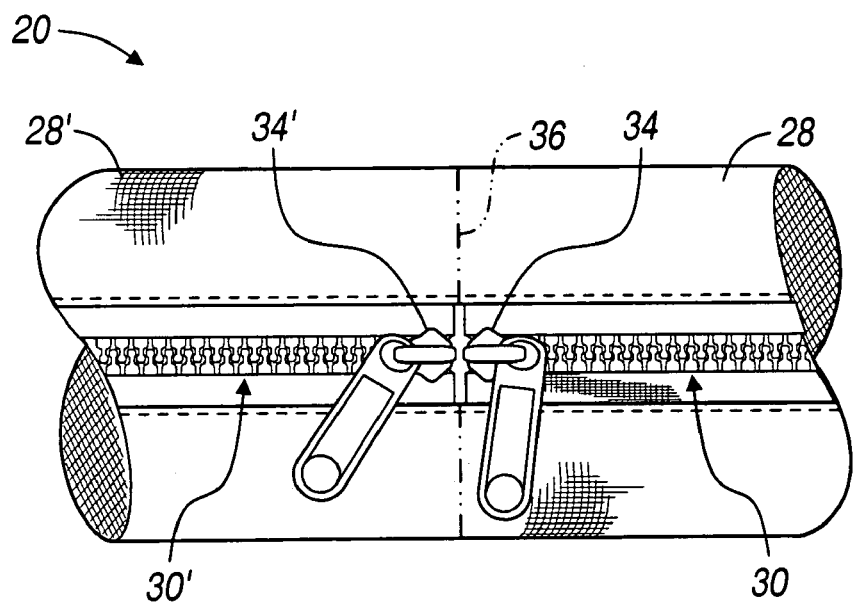
FIG. 2 is another partial top plan view of an intermediate region of the preferred protective sleeve assembly of FIG. 1, illustrated in a closed orientation thereof.
Figure 3:
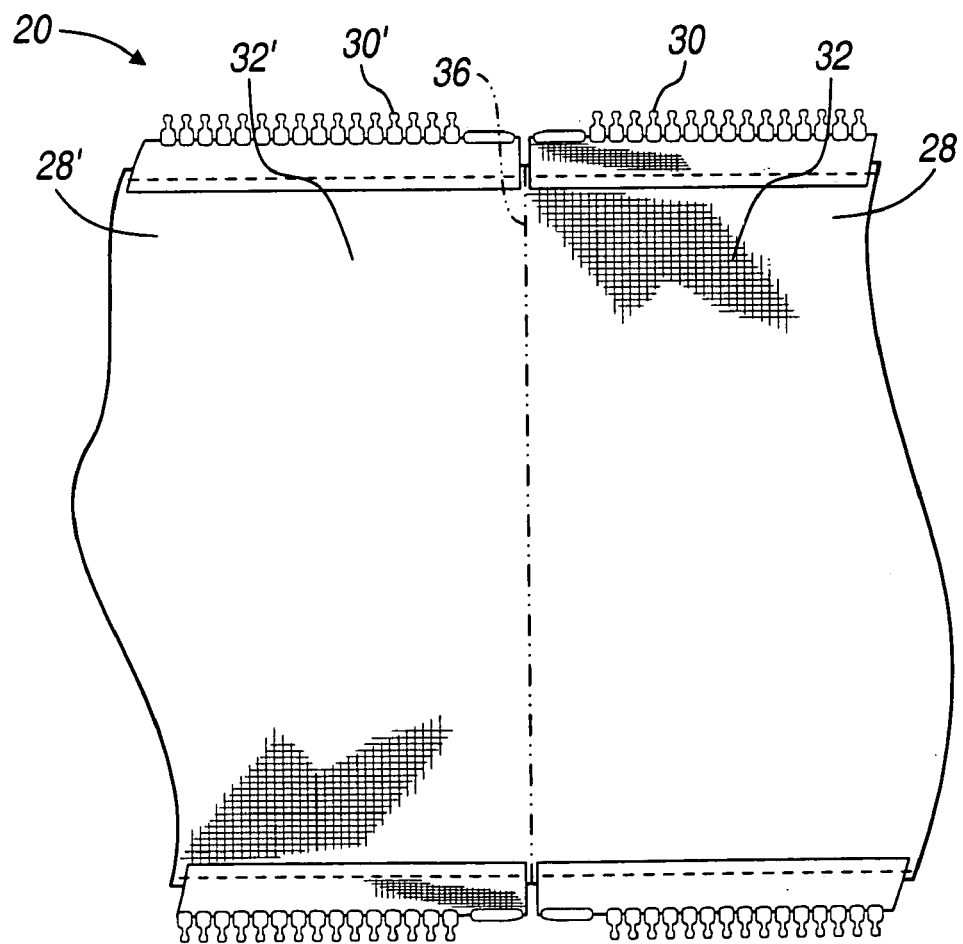
FIG. 3 is a partial top plan view of the protective sleeve intermediate region of FIG. 2, illustrated in an open orientation thereof.

Referring now to FIGS. 2 and 3, an intermediate portion of the protective sleeve assembly 20 is illustrated in a closed orientation, and in an open orientation respectively. The protective sleeve assembly 20 includes a pair of zippers 30, 30' each affixed along the seam for providing access to the sleeve internal region 32. The zippers 30, 30' are oriented along the seam end to end, or with an end of the first zipper 30 being coterminously adjacent to an end of the second zipper 30'. Each zipper 30, 30' includes a sliding member 34, 34' for facilitating the opening and closing of the respective zipper 30, 30'.

The protective sleeve assembly 20 is provided with a pair of zippers 30, 30' so that the sleeve 28 may be separated for providing the sleeve 28 at a desired sleeve length, or for providing a pair of sleeves 28, 28', each at a desired protective sleeve length. The preferred embodiment sleeve assembly 20 is separated by a cutting operation performed at a region of the sleeve 28 that is aligned with the zipper ends. This region is illustrated by a cutting line 36 illustrated in phantom in FIG. 2. The cutting operation required to cut the sleeve 28 of the preferred embodiment is a manual cutting operation such as that provided by a pair of scissors. The fabric sleeve 28 of the preferred embodiment is formed of a canvas material that is generally weather resistant, yet susceptible to the cutting operation, as described.

In certain applications that require cords 22, the cords 22 typically are provided in incremental lengths. Accordingly, the separation region of the protective sleeve assembly 20 is provided at a location on the sleeve 28 that is representative of an incremental length so that the sleeve 28 may be shortened to such a length.

Although the preferred embodiment requires a cutting operation for separation of the sleeves 28, 28', other methods of separation are contemplated within the scope of the invention. Specifically, a frangible region may be provided so that the sleeves 28, 28' may be separated by tearing operation. For example, a series of transverse slits may be provided in the cover 28 at the cutting line 36. Thus, in order to separate the sleeves 28, 28', the user merely tears the sleeves along the frangible cutting line 36. However, this alternative is not provided in the preferred embodiment, because such frangible regions weaken the strength of the sleeve 28, and may inadvertently tear when not desired.

Figure 4:
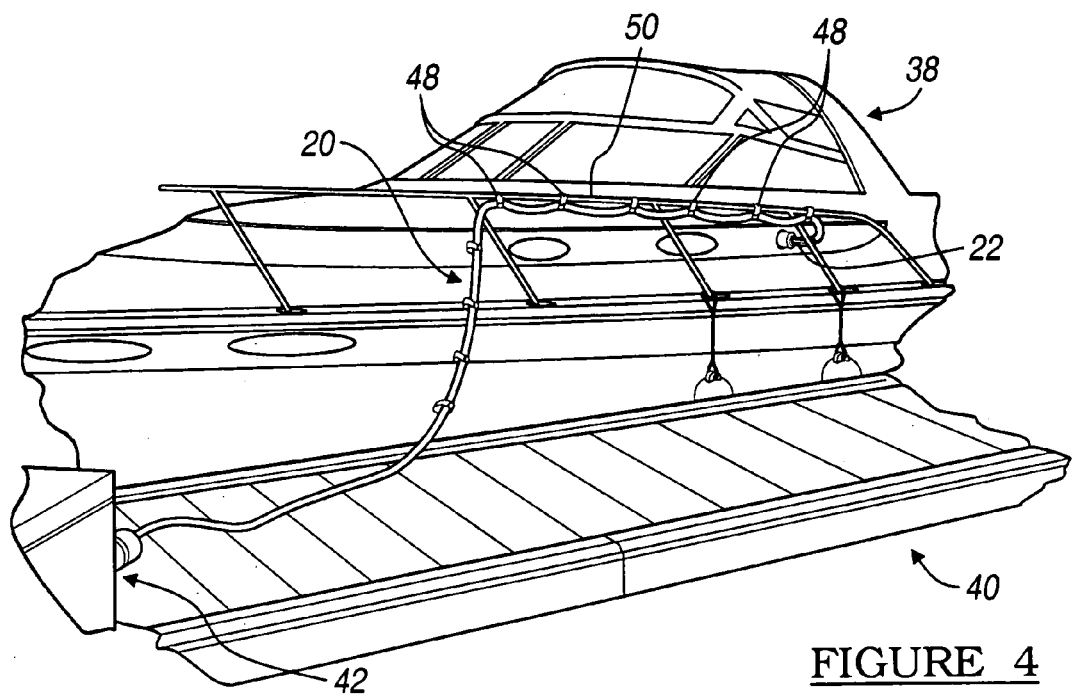
FIG. 4 is a perspective view of the preferred embodiment protective sleeve assembly of FIG. 1 illustrated in an application therefor.

Referring now to FIG. 4, the preferred embodiment protective sleeve assembly 20 is illustrated utilized in a marine application. Specifically, a boat 38 is illustrated moored to a dock 40. In such a marine application, it is common to run a plurality of cords 22 from the boat 38 to a junction box 42 that is provided on or near the dock 40. The junction box 42 may typically provide a power supply and other commodities such as a telephone line, a television signal, or the like. During extended periods of docking, the cords 22 are run from the boat 38 to the power supply 42 and are typically laid or secured to the boat 38 and/or the dock 40. This arrangement of the cords 22 may subject the cords to the elements, and wear caused by pedestrians passing thereby. Additionally, the plurality of cords 22 may cause a safety hazard particularly in recreation areas that are populated by children and pets. Accordingly, the protective sleeve 20 encloses a majority of the length of the cords 22 therein and manages them in a unitary bundle thereby minimizing hazards and damage to the cords 22. Further, the sleeve 28 may be provided in a color that is readily recognizable to the view of pedestrians. In such marine applications, the sleeve 28 is provided from a marine canvas material which may be similar to or matching with the canvas provided on the conventional boat 38.

Cords 22 that are provided for marine applications typically run in lengths that are factors of twelve feet. Accordingly, the preferred embodiment protective sleeve assembly 20 is provided in an incremental length thereof, specifically twenty-four feet. Therefore, the sleeve may be utilized with cords 22 having a length of twenty-four feet, or the sleeves 28 may be separated into the pair of sleeves 28, 28', each having a length of twelve feet, and one of which may be utilized as illustrated in FIG. 4. Even further, the protective sleeve assembly 20 manages the cords 22 in a manner that is simplified and more aesthetically pleasing.

Figure 5:
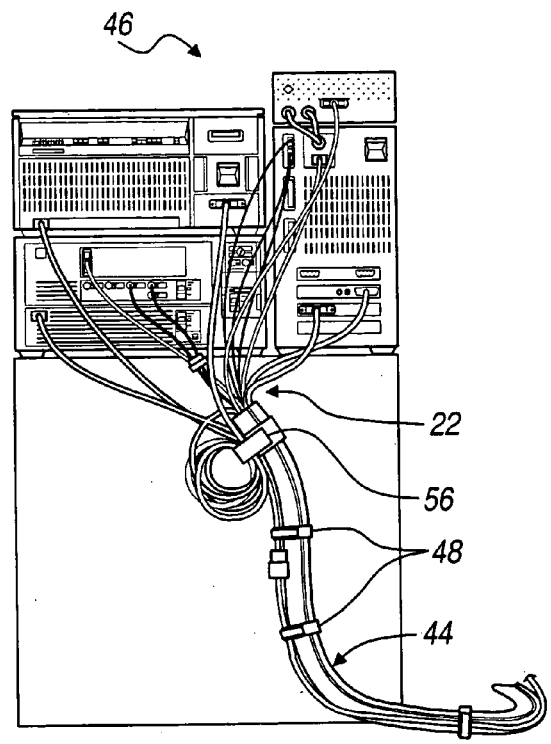
FIG. 5 is a perspective view of another preferred embodiment protective sleeve assembly illustrated in another application therefor, in accordance with the present invention.

Referring now to FIG. 5, another preferred embodiment protective sleeve assembly 44 is illustrated in utilization with electronic equipment. This application may be preferred for indoor use for managing the number of cables required to operate electronic equipment such as computer equipment 46 as shown, or other electronic equipment such as audio/video equipment, power tools, or the like. The protective sleeve assembly 44 covers and protects the associated cords 22 from wear and damage and minimizes hazards and the aesthetic effects of the plurality cords 22, which would otherwise be spanned from the equipment 46 to the power source (not shown). The cords 22 for indoor applications are typically provided in six foot lengths. Accordingly, the preferred embodiment protective sleeve assembly 44 is provided in a five foot length to accommodate the indoor cords 22 while permitting the cords to extend therefrom to each various terminating location for the associated piece of equipment. The preferred protective sleeve assembly 44 for indoor use includes a pair of zippers 30, 30' coterminous at a region that is two feet from one of the distal ends thereof such that separation at this region provides a sleeve having a length of two feet and another sleeve having a length of three feet. Of course any length of the sleeve assembly 44 is contemplated; and any incremental length and any number of separations is contemplated within the spirit and scope of the present invention.

Figure 6:
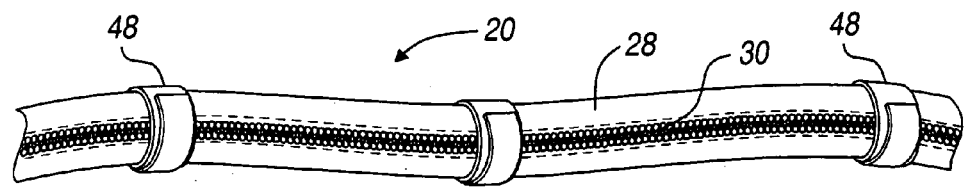
FIG. 6 is a partial perspective view of the preferred embodiment protective sleeve assembly of FIG. 1.
Figure 7:
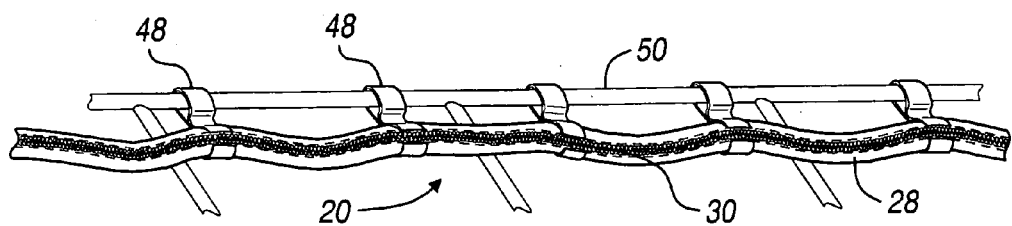
FIG. 7 is another perspective view of the protective sleeve assembly of FIG. 1.

Referring now to FIGS. 6 and 7, another feature of the protective sleeve assembly 20 is illustrated. Specifically, the protective sleeve assembly 20 includes a series of straps 48 affixed along the length of the sleeve 28. The straps 48 are formed from a hook and loop material with the hook material oriented on one surface and the loop material formed on the other surface. As illustrated in FIG. 6, the straps 48 may be utilized for tightening the sleeve 28 about the cords 22 that are disposed therein. Referring to FIG. 7, the straps may be utilized for affixing the sleeve 28 to a support member, such as a rail 50 of the boat 38. Mounting the sleeve 28 to the rail 50 helps preventing the cords 22 from getting in the way of pedestrians, boaters and the like.

Figure 8:
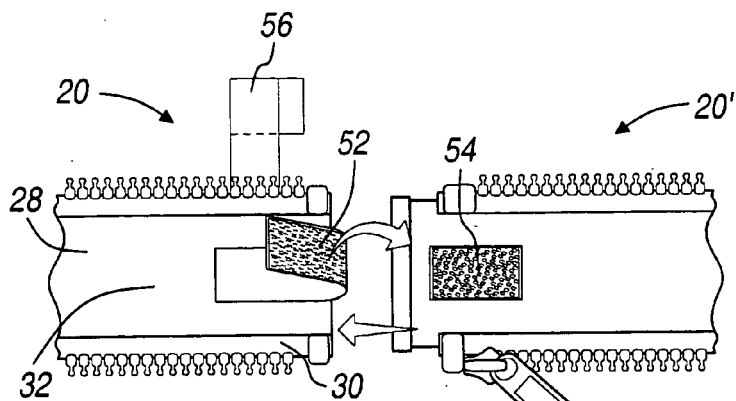
FIG. 8 is an enlarged partial top plan view of a pair of preferred embodiment protective sleeve assemblies.

Referring now to FIG. 8, the preferred embodiment protective sleeve assembly 20 includes a strap 52 affixed to a first distal end thereof for joining the protective sleeve assembly to another protective sleeve assembly 20'. The strap is formed of a hook material. A corresponding member 54 is formed of a loop material and is affixed within the other distal end of the protective sleeve assembly 20. Therefore, a pair of protective sleeve assemblies 20, 20' may be adjoined at coterminous ends for achieving lengths greater than twenty-four feet. The invention contemplates providing the end strap 52 and the loop member 54 on opposed sides of the cutting line 36 for reconnecting the sleeve 28, 28' after the cutting operation.

Referring again to FIG. 1, the protective sleeve assembly 20 includes a transverse strap 56 affixed to a distal end of the sleeve 28 for securing a surplus of length of one of the cords 22 that is received within the sleeve 28. The strap 56 is formed of a hook and loop material so that it can interconnect to itself for retaining the surplus length of the cord 22. Therefore, if the protective sleeve assembly 20 is utilized with a plurality of cords 22 having varying lengths, the extra length of each individual cord may be coiled into a loop and retained by the strap 56.

Figure 9:
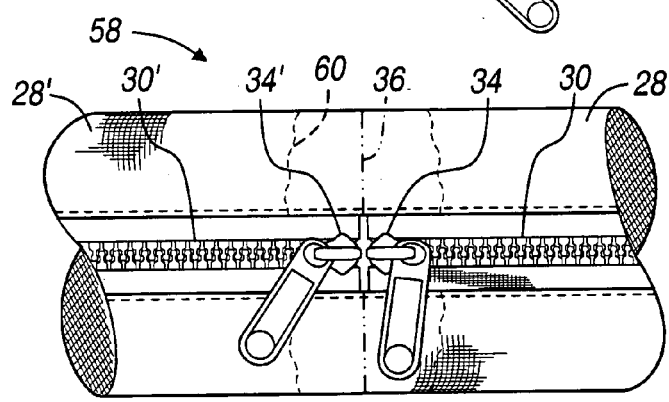
FIG. 9 is a partial top plan view of an alternative embodiment protective sleeve assembly intermediate region illustrated in a closed orientation thereof, in accordance with the present invention.
Figure 10:
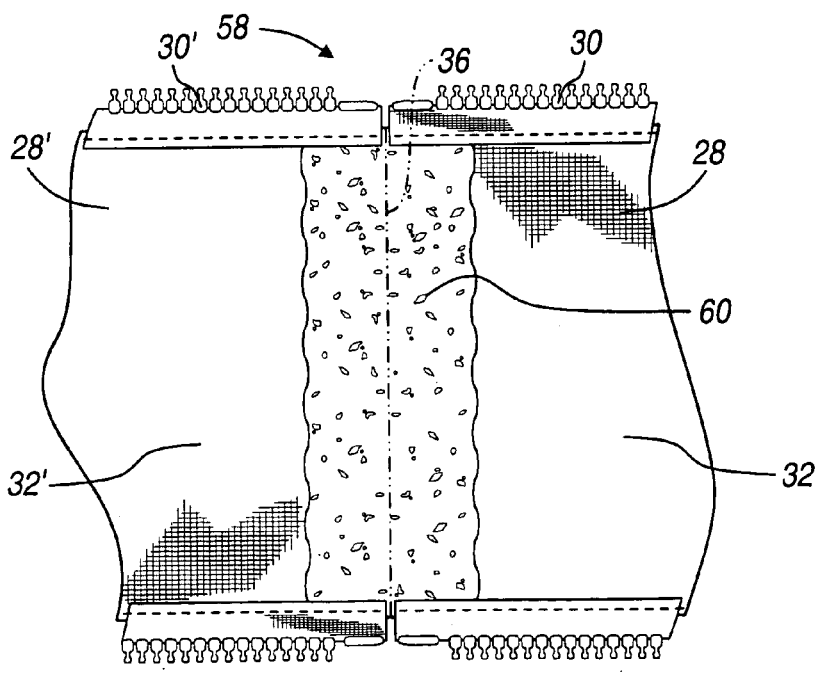
FIG. 10 is a partial top plan view of the protective sleeve assembly intermediate region of FIG. 9, illustrated in an open orientation thereof.

Referring now to FIGS. 9 and 10, an alternative embodiment protective sleeve assembly 58 is illustrated in a closed orientation and an open orientation, respectively. Specifically, an intermediate region is illustrated wherein coterminous ends of the zippers 30, 30' meet. Similar elements retain same reference numerals wherein new elements are assigned new reference numerals. The protective sleeve assembly 58 is similar to the preferred embodiment sleeve assembly 20, however a flexible adhesive coating 60 is applied to the sleeve 28 within the sleeve internal region 32 and overlapping the cutting line 36. The flexible adhesive coating 60 is provided for reinforcing the canvas material on either separate sleeve 28, 28' after the cutting operation. The adhesive coating 60 adheres to the canvas and prevents or minimizes fraying along the cutting line 36. Preferably, the adhesive coating 60 is applied so that it does not seep through the sleeve material, thus avoiding affecting the external aesthetic view of the sleeve 28.

Figure 11:
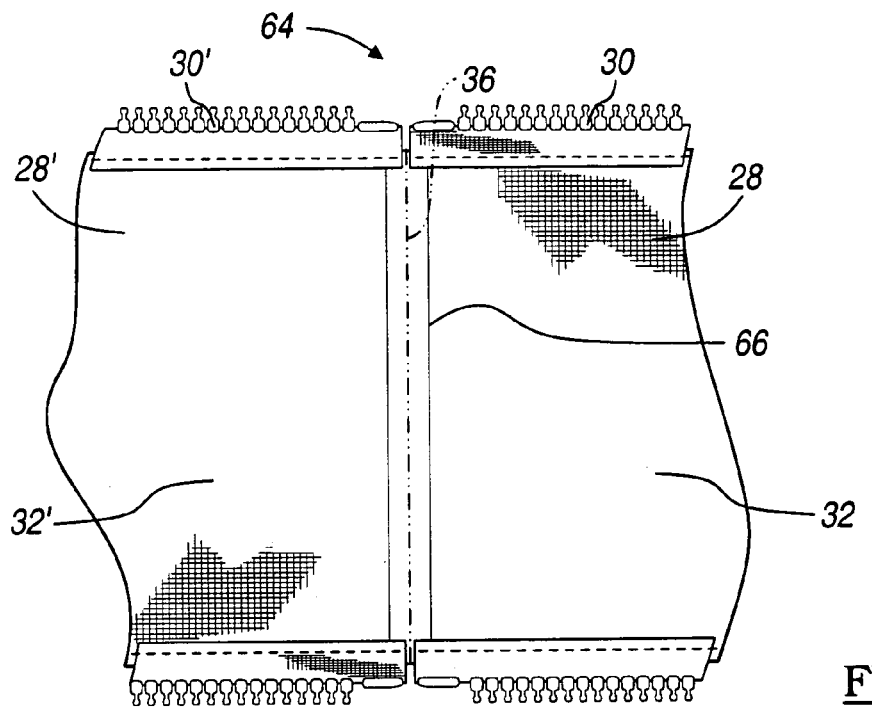
FIG. 11 is a partial top plan view of another alternative embodiment protective sleeve assembly intermediate region, illustrated in an open orientation thereof, in accordance with the present invention.

Referring now to FIG. 11, another alternative embodiment protective sleeve assembly 64 is illustrated in accordance with the present invention. Rather than utilizing an adhesive coating, as in the prior embodiment, the protective sleeve assembly 64 includes a piece of reinforcement tape 66 applied to the sleeve internal region 32 overlapping the cutting line 36. The reinforcement tape 66 reinforces the canvas material of the sleeve 28, 28' at the separated region and prevents fraying through and after the cutting operation. Further, the reinforcement tape 66 prevents any ill aesthetic effects externally when in the closed orientation.

Figure 12:
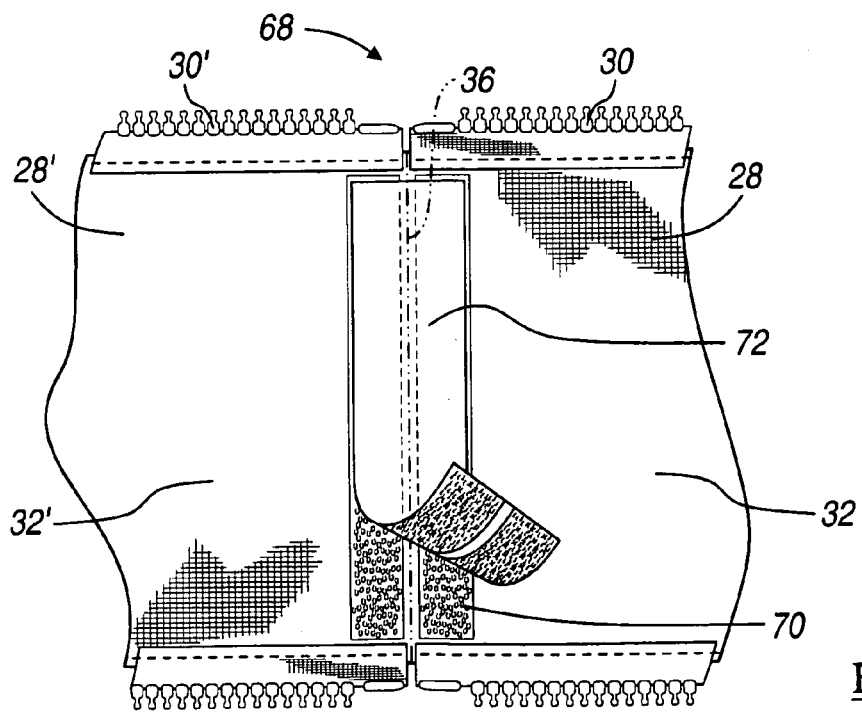
FIG. 12 is a partial top plan view of yet another alternative embodiment protective sleeve assembly intermediate region, illustrated in an open orientation thereof, in accordance with the present invention.

Referring now to FIG. 12, yet another alternative embodiment protective sleeve assembly 68 is illustrated in accordance with the present invention. The sleeve 28 includes a reinforcement member 70 formed of a loop material. The reinforcement member 70 is affixed to the sleeve internal region 32 overlapping the cutting line 36. The reinforcement member 70 reinforces the separated ends of the sleeves 28, 28' after the cutting operation. Additionally, a connecting member 72 is included in the sleeve assembly 68 for reconnecting a separated pair of sleeves 28, 28' by interlocking with the separated reinforcement member 70, 70' of each separated sleeve 28, 28'.

Figure 13:
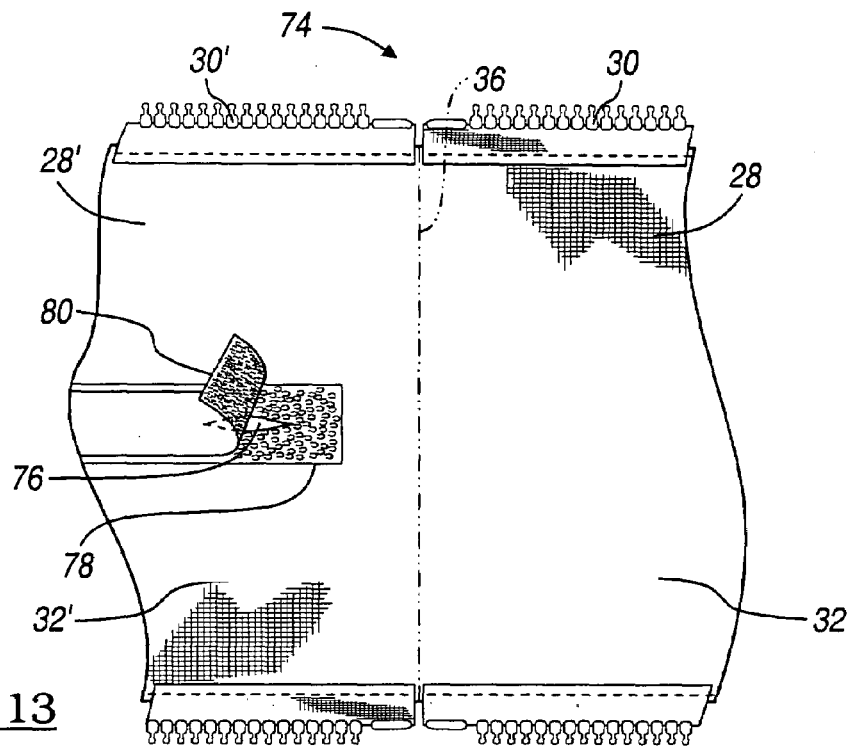
FIG. 13 is another top plan view of an alternative embodiment protective sleeve assembly intermediate region, illustrated in an open orientation thereof, in accordance with the present invention.
Figure 14:
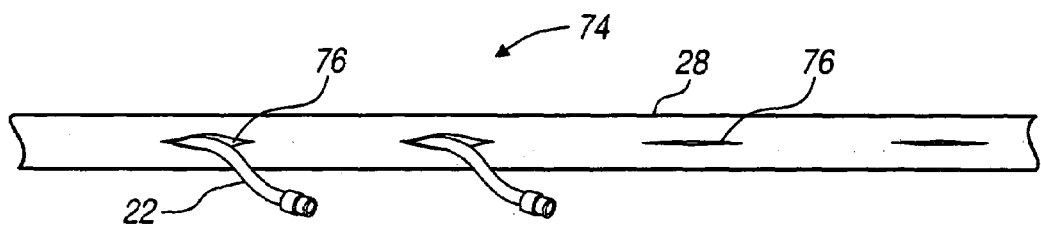
FIG. 14 is a partial perspective view of the protective sleeve assembly of FIG. 13, illustrated in a closed orientation.

Referring now to FIGS. 13 and 14, an alternative embodiment protective sleeve assembly 74 is illustrated in accordance with the teachings of the present invention. The sleeve 28 of the protective sleeve assembly 74 includes a series of openings 76 formed along the length of the sleeve 28. The openings 76 permit the cords 22 to exit the sleeve 28 at various locations along its length, rather than merely at the distal ends. Therefore, the protective sleeve assembly 74 operates like a conduit for receiving and disseminating cords 22 at various locations along its length. Referring specifically to FIG. 13, the protective sleeve assembly 74 is illustrated in an open view thereof. An opening reinforcement member 78 is provided about each opening 76 for reinforcing the sleeve material around the opening 76. The opening reinforcement member is formed of a loop material. A corresponding patch 80 is also provided for each opening 76 to cover the respective opening 76. The patch 80 is formed of a hook material for securing to the loop material of the opening reinforcement member 78. The patch 80 may cover the opening 76, when not utilized. Due to the flexible material of the patch 80, the patch 80 may be provided over the corresponding opening 76 when a cord 22 passes therethrough, thereby covering any clearance provided around the cord 22.

Figure 15:
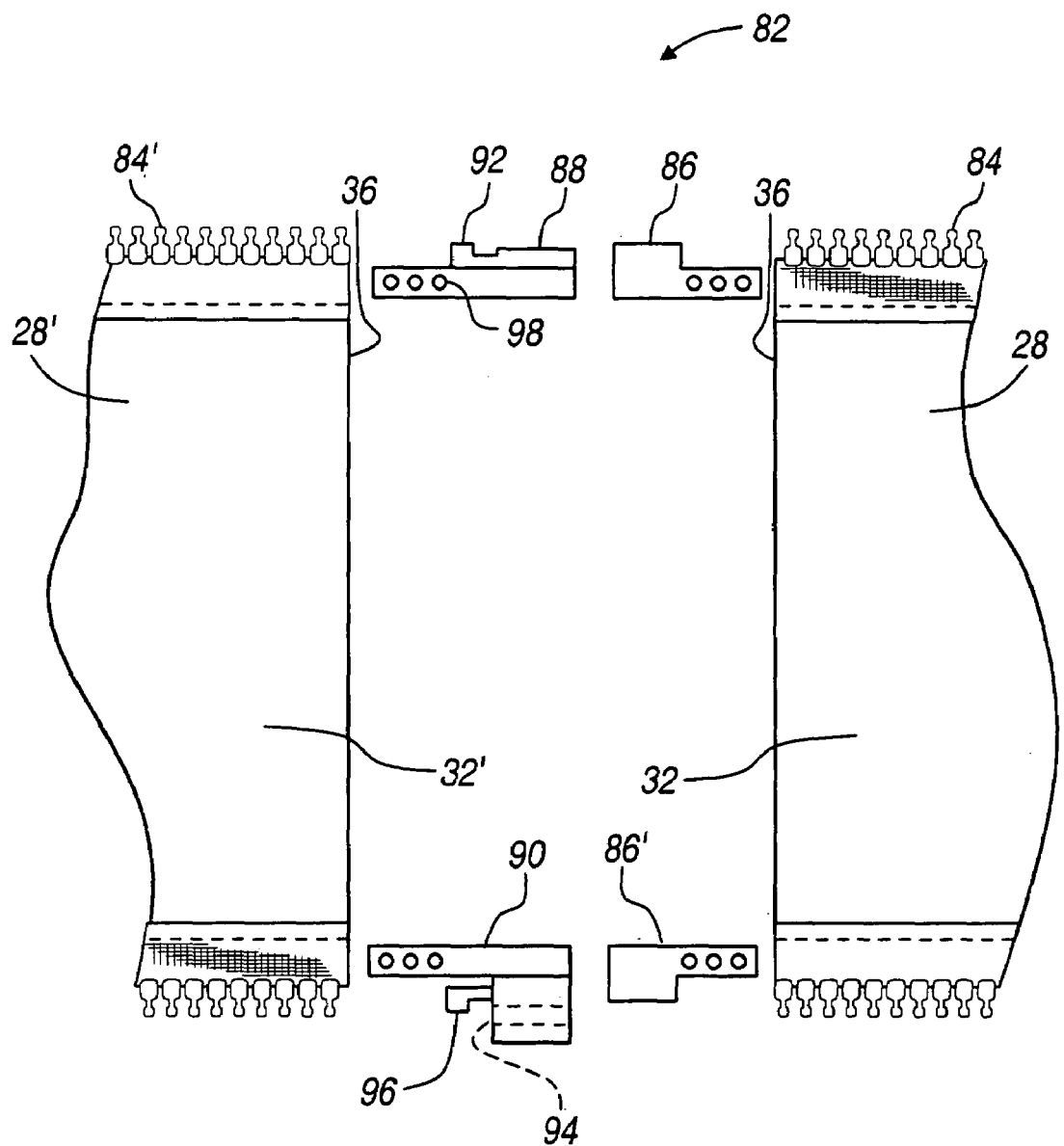
FIG. 15 is a top plan view of yet another alternative embodiment protective sleeve assembly intermediate region, illustrated in an open orientation thereof, in accordance with the present invention.

Referring now to FIG. 15, an alternative embodiment protective sleeve assembly 82 is partially illustrated in an open orientation thereof and partially exploded. The invention contemplates any lengthwise fastener formed along the sleeve 28 that may be separated into a pair of lengthwise fasteners such as the pair of zippers 30, 30' in the preferred embodiment, or alternatively, lengthwise fasteners that provide an airtight or watertight seal along the length, or the like. The invention also contemplates a unitary lengthwise fastener that may be separated into a pair of lengthwise fasteners. Accordingly, a lengthwise zipper 84 may be provided that can be cut along the cutting line 36 and separated into a pair of zippers 84, 84'. Accordingly, the zipper 84 must be provided with a pair of sliding members 34, 34' (not shown). The second sliding member may be provided prior to the cutting operation and may be oriented in the same functional direction as the primary sliding member or they may be faced oppositely such that the sleeve is closed when the sliding members 34, 34' are slid together.

In order to prevent the sliding members 34, 34' from disconnecting from the zipper 84, 84' after the cutting operation, a plurality of stopping member pairs 86, 86', 88, 90 are provided. The pair of stopping members 86, 86' are configured to stop the respective sliding member 34, 34' at an orientation of the sliding member 34, 34' that closes the zipper 84. In other words the stopping members 86, 86' operate similar to a pair of blades located at a closed end of a conventional zipper. The stopping members 86, 86' prevent the sliding member 34 from surpassing this location because the stopping members abuttingly engage rather than interconnect like zipper teeth, and are unable to pass through the sliding member 34.

The stopping members 88, 90 are configured such that the lowermost stopping member 90 stops the sliding member 34 along its path in a direction that opens the zipper 84', and the uppermost stopping member 88 is sized to disconnect from the sliding member 34 for providing a fully open sleeve 28'. Stopping member 88 is depicted as a conventional blade with a forward tooth 92. The stopping member 88 is sized to be received within a slot 94 formed within the stopping member 90; and the tooth 92 interconnects with a corresponding tooth 96 of the stopping member. Upon opening of the sleeve 28', the associated sliding member 34' is slid into abutting engagement with the stopping member 90. At this orientation of the sliding member 34', the stopping member 88 may be removed from the slot 94, thus disconnecting the stopping member pair 88, 90.

Each stopping member 86, 86', 88, 90 includes a series of apertures 98 formed therethrough so that they may each be sewn to the sleeve 28 or fastened thereto by a rivet. Alternatively, the stopping members 86, 86', 88, 90 may be crimped or adhered to the sleeves 28, 28'. Although, the alternative embodiment protective sleeve assembly 82 illustrates a lengthwise fastener that may be separated into a pair of lengthwise fasteners, the preferred embodiment protective sleeve assembly 20 includes a pair of zippers 30, 30' to provide a simplified separation operation of the sleeve 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A protective sleeve assembly for cords, the sleeve assembly comprising:
    a longitudinal flexible sleeve having a pair of distal ends and a lengthwise seam, the longitudinal sleeve having an internal region sized to receive a plurality of cords disposed therein; and
    at least a pair of lengthwise fasteners affixed along the seam for providing access to the sleeve internal region, each lengthwise fastener having an end oriented coterminously adjacent to an end of the other lengthwise fastener;
    wherein the sleeve may be selectively separated into a pair of sleeves at a region of the sleeve generally aligned with coterminous ends of a pair of the lengthwise fasteners to provide a desired protective sleeve length; and
    wherein the sleeve includes a frangible region aligned with the coterminous ends of the pair of the lengthwise fasteners, permitting the sleeve to be separated by a tearing operation.

2. The protective sleeve assembly of claim 1 wherein at least one of the pair of lengthwise fasteners further comprises two elongate rows of mechanical teeth, each affixed to transversely opposed seam regions, and a sliding member cooperating with the rows of teeth for interconnecting the teeth and closing the sleeve as the sliding member is slid in a first direction and for disconnecting the teeth and opening the sleeve as the sliding member is slid in a second direction.

3. The protective sleeve assembly of claim 1 further comprising at least one strap affixed proximate to one of the sleeve pair ends, the at least one strap being adapted for securing a surplus in length of the cords thereto.

4. The protective sleeve assembly of claim 1 further comprising a strap affixed to one distal end thereof adapted for adjoining a pair of coterminous sleeves.

5. The protective sleeve assembly of claim 1 further comprising a strap affixed to one distal end thereof, the strap being formed from one of a hook and loop material, and a member formed of the other of a hook and loop material is affixed to the other distal end of the sleeve for adjoining a pair of coterminous sleeves.

6. The protective sleeve assembly of claim 1 wherein the sleeve is sized for marine applications.

7. The protective sleeve assembly of claim 1 wherein the sleeve is sized for indoor applications.

8. The protective sleeve assembly of claim 1 further comprising a series of openings formed along the length of the sleeve for permitting at least one cord to pass therethrough.

9. The protective sleeve assembly of claim 8 further comprising a series of patches, each patch being sized to cover one of the series of openings, and each patch being selectively affixable to the sleeve.

10. The protective sleeve assembly of claim 1 further comprising a series of straps affixed therealong.

11. The protective sleeve assembly of claim 10 wherein the series of straps each include a surface formed from a hook material and another surface formed from a loop material.

12. The protective sleeve assembly of claim 10 wherein the straps are adapted for intermittently tightening the sleeve about the cords.

13. The protective sleeve assembly of claim 10 wherein the straps are adapted for mounting the sleeve to an external support member.

14. The protective sleeve assembly of claim 1 wherein the sleeve is adapted to be selectively separated by a cutting operation.

15. The protective sleeve assembly of claim 14 further comprising a flexible adhesive coating applied to the sleeve region aligned with the coterminous ends of the pair of lengthwise fasteners.

16. The protective sleeve assembly of claim 15 further comprising a piece of reinforcement tape applied to the sleeve region aligned with the coterminous ends of the pair of lengthwise fasteners.

17. The protective sleeve assembly of claim 14 further comprising one of a hook and loop material applied to the sleeve region aligned with the coterminous ends of the pair of lengthwise fasteners.

18. The protective sleeve assembly of claim 17 further comprising a connecting member formed of the other of the hook and loop material for reconnecting the pair of sleeves.

19. A method for protecting cords comprising:
    providing a sleeve having at least a pair of lengthwise fasteners each affixed coterminously along a lengthwise seam thereof, the sleeve being sized to receive a plurality of cords disposed therein;
    providing a region of the sleeve aligned with coterminous ends of a pair of the lengthwise fasteners that may be separated; and
    separating the sleeve at the region aligned with the coterminous fastener ends to provide a desired protective sleeve length.

* * * * *